Jan. 3, 1950     C. R. SACCHINI     2,493,552
WINDSHIELD WIPER MECHANISM

Filed June 11, 1945     3 Sheets-Sheet 1

INVENTOR
COLUMBUS R. SACCHINI
BY *George M. Soule*
ATTORNEY

Jan. 3, 1950    C. R. SACCHINI    2,493,552
WINDSHIELD WIPER MECHANISM
Filed June 11, 1945    3 Sheets-Sheet 2
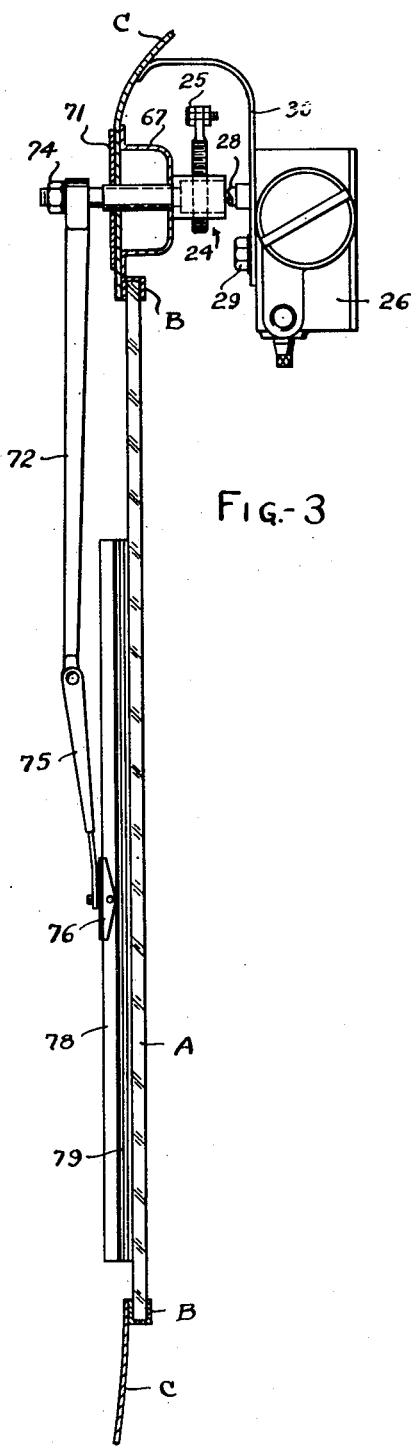
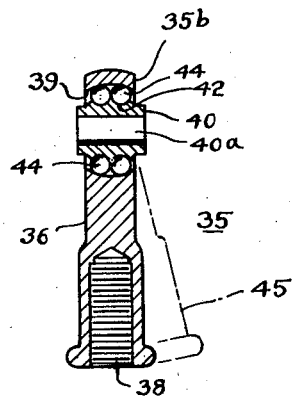
INVENTOR
COLUMBUS R. SACCHINI
BY George M. Soule
ATTORNEY Jan. 3, 1950 C. R. SACCHINI 2,493,552
WINDSHIELD WIPER MECHANISM
Filed June 11, 1945 3 Sheets-Sheet 3

INVENTOR
COLUMBUS R. SACCHINI
By George M. Soule
ATTORNEY

Patented Jan. 3, 1950

2,493,552

UNITED STATES PATENT OFFICE 2,493,552

WINDSHIELD WIPER MECHANISM

Columbus R. Sacchini, Willoughby, Ohio, assignor to The Marquette Metal Products Company, Cleveland, Ohio, a corporation of Ohio Application June 11, 1945, Serial No. 598,877

10 Claims. (Cl. 74—96)

This invention relates to motion transmission mechanisms, and more particularly to a mechanism comprising rigid linkages and universal couplings for transmitting alternate rotary motion between non-parallel shafts. The invention is eminently suitable for use in window or windshield wiping installations, and is described herein as applied for that purpose, but not by way of limitation.

The advent of the curved windshield on vehicles such as the airplane and automobile has created problems relating to the transmission of alternate rotary motion from a single power source such as a prime mover (e. g. hydraulic motor) or motion converter to a pair of windshield wiper drive arms connected to respective wiper blades. For the most satisfactory wiping action, the wiper blades are mounted on opposite sides respectively of the center line of the windshield and the power source is disposed therebetween. Furthermore, so that the wiper blades can sweep most effectively across the curved windshield surface, the rotatable shafts upon which the drive arms are respectively mounted are preferably normal to the tangent plane of the glass panel or panels at the shaft positions, and likewise the power take-off shaft of the power source is also normal to the tangent plane at its location or normal to the principal plane of the windshield panel assembly. Consequently, the drive arm shafts diverge forwardly of the vehicle and neither is parallel to the power take-off shaft of the power source. Similar problems are presented and conditions obtained in connection with plural wiper installations on V-type windshields.

Heretofore, flexible rotatable shafts or flexible push-pull rods have been used as the motion transmitting means between shafts disposed as above described, but neither is entirely satisfactory because of their excessive cost, relative inefficiency, and inability to render long periods of trouble free operation.

An object of this invention is to provide an improved means for transmitting alternate rotary motion between non-parallel shafts.

Another object is to provide improved means for transmitting alternate rotary motion from a driving shaft to a pair of mutually divergent driven shafts.

Another object is to provide means comprising rigid linkages and universal couplings for rotatably driving a pair of mutually divergent driven shafts from a rotatable driving shaft parallel to neither of the driven shafts.

Another object is to provide a motion converter for changing push-pull motion into alternate rotary motion and in which the linear or axial direction of the push-pull motion varies during the cycle.

A more specific object is to provide an improved windshield wiping mechanism operable for wiping a curved surface.

A correlative object is to provide an improved mechanism for driving a pair of windshield wipers to and fro across spaced and cylindrically curved windshield areas from a single source take-off means of a power source.

Other objects and advantages will become apparent from the following description of the preferred form shown in the drawings, in which:

Fig. 3 is a fragmentary side elevation of the mechanism of Fig. 2;

Figs. 4 and 5 are central longitudinal sectional views of a universal coupling and of a window unit, respectively.

Figure 1:
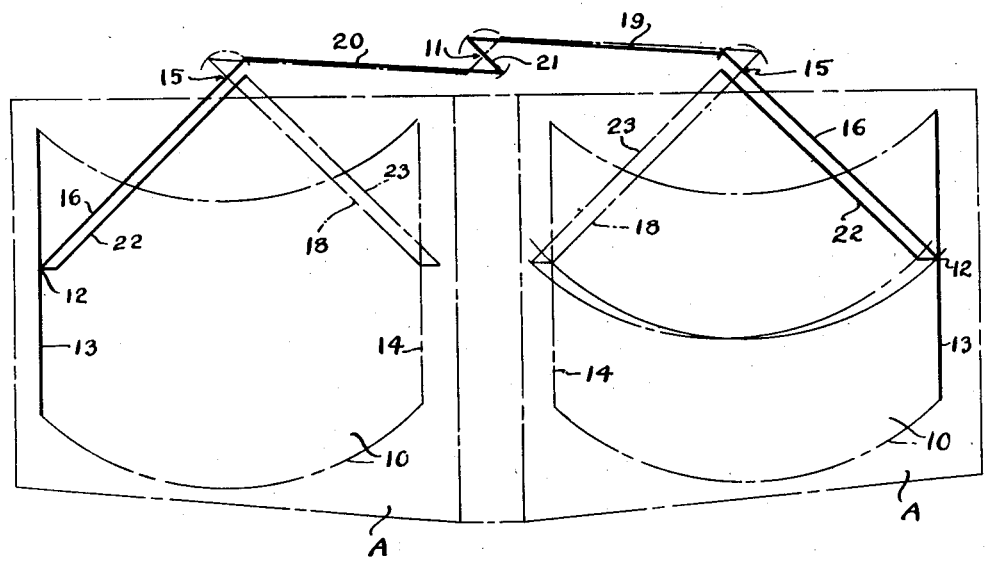
Fig. 1 is a motion diagram of a typical mechanism in accordance with this invention.

Referring principally to Fig. 1, the herein described embodiment of the invention is a motion transmitting and converting mechanism capable of driving a plurality of windshield wiper blades to and fro across respective areas 10 of a cylindrically curved window or windshield A (cf. Fig. 2) in response to alternate rotary motion of a shaft having an axis 11 which is normal to the plane of the paper. As the wiper blades travel back and forth, each revolves in a circular orbit about the associated axis of curvature of the windshield A between respective solid line positions 13 and broken line positions 14. Movement is imparted to the wiper blades as a result of alternate rotary motion of wiper blade drive arms about respective axes 15 between extreme positions 16 and 18.

The alternate rotary motion of the drive arms is effected through respective rigid links indicated at 19 and 20 and operatively disposed between respective opposing outer end portions of a double-ended crank arm 21, medially pivoted on the axis 11, and the end portions of the respective wiper blade drive arms which, as shown in Fig. 1, are on opposite sides (top, Fig. 1) of the respective axis 15 from the wiper blades. Rotary movement of the wiper blades about their respective transverse axes 12 may be prevented by respective rigid links or tie-rods having extreme positions 22 and 23. In order that the wiper blades may most effectively follow the curvature of the windshield A (convex outwardly of the plane of the paper in Fig. 1), the axes 15 converge inwardly, i. e. rearwardly from the plane of the paper, and lie in respective planes which are substantially radial with respect to the curvature of the windshield. Because of the non-parallelism between the axes 11 and 15, simple crank and push-pull linkages cannot be used as the sole driving connection therebetween. With the foregoing explanation of the general problem presented, reference may be had to Fig. 2 and Fig. 6 wherein it will be seen that the illustrated embodiment of the present invention provides an extremely simple solution thereof without departing from the general configuration of the motion diagram of Fig. 1.

Briefly, in accordance with this invention, means constituting universal joints or couplings (not shown in Fig. 1) are provided at opposite ends of the links 19 and 20 thereby to render it possible for the links 19 and 20 to be rigid.

Figure 2:
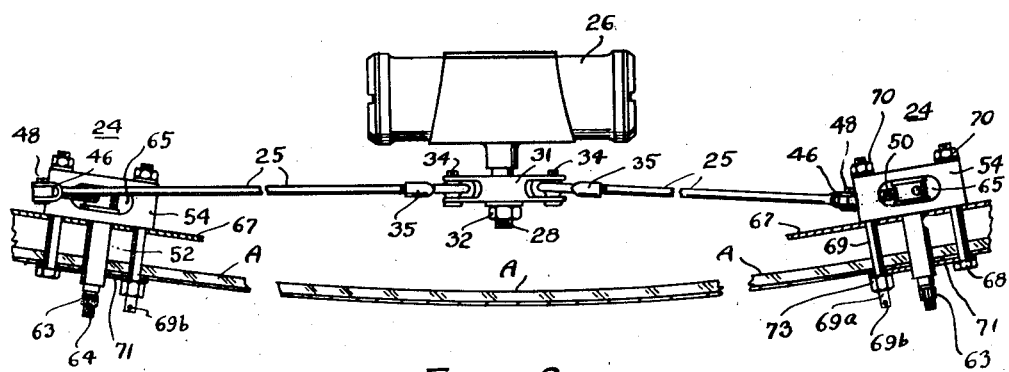
Fig. 2 is a fragmentary top plan view of different portions of the mechanism associated with respective portions of a curved windshield.

In Figs. 2 to 6 the cylindrically curved windshield A is suitably supported as in a channeled frame or casement B carried by a body panel C of a vehicle (not shown) and may be divided into two spaced portions as indicated in Fig. 1 or of one-piece construction as shown in Fig. 2. The motion transmitting and converting mechanism comprises generally a pair of identical motion converters or window units 24 driven through respective push-pull rods 25 by a motive unit 26 which may be either a hydraulic motor or a motion converter capable of receiving power from a conventional electric motor and imparting alternate rotary motion to a power take-off shaft 28. The motive unit 26 may be secured as by a cap screw 29 (Fig. 3) to an inverted L-shaped bracket 30 mounted inside of the vehicle on the panel C, and is preferably disposed slightly above and medially between the spaced areas 10 (Fig. 1) of the windshield A which are to be wiped. Said unit 26 could, of course, be otherwise supported.

Figure 6:
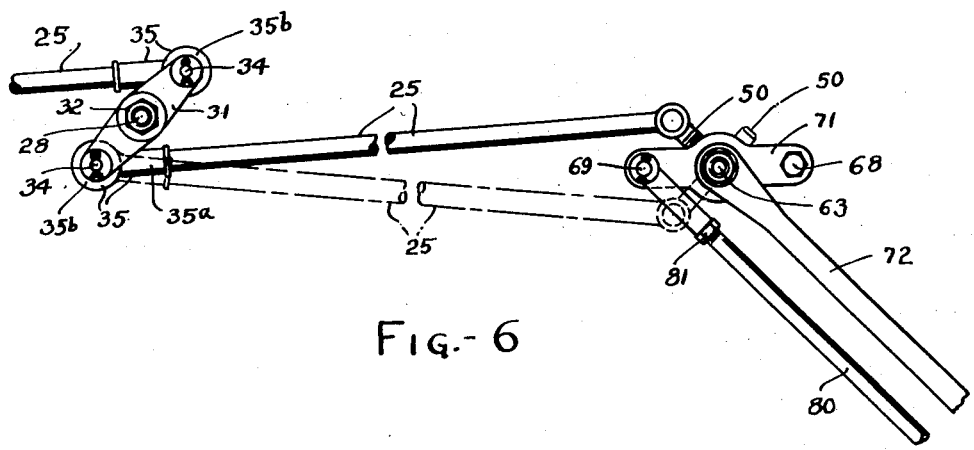
Fig. 6 is a detail front elevational view of a portion of the mechanism.
Figure 5:
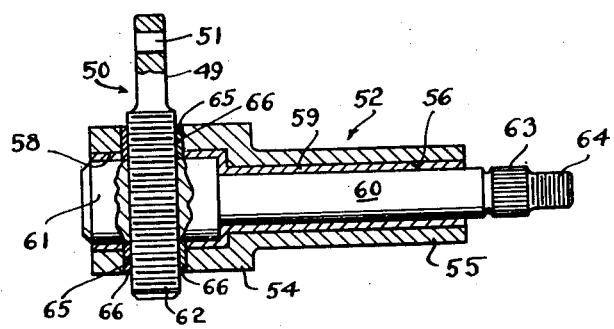

A double-ended crank arm 31 (Figs. 2 and 6) is mounted upon an outer end portion of the shaft 28 and is preferably secured against relative rotation with respect to the shaft by a splined, e. g. serrated, connection (not shown) thereby permitting the mounting of the arm in various adjusted turned positions, a nut 32 being threaded over the outer end portion of the shaft to hold the crank arm against axial movement outwardly of the shaft. Opposite end portions of the arm 31 are bifurcated and provided with respective transverse bores for receiving suitable clevis pins 34, respectively, which rotatably support respective engine controls or couplings 35 which constitute universal joints and are disposed in driving relationship between the opposite end portions respectively of the arm 31 and the respective push-pull rods 25. The rods 25 may be tubular if desired or solid as indicated in Fig. 6.

Each of the couplings 35 comprises an elongated body member 36 (Fig. 4) having a threaded axial socket 38 in a cylindrical end portion 35 and a transverse opening 39 of approximate spherical contour in an opposite flattened end portion 36b. A tubular bushing 40 having an axial opening 40a is loosely received in the opening 39 and has an enlarged central portion provided with a pair of axially spaced annular grooves 42 around its outer periphery. A plurality of balls 44 are received in the grooves 42 and roll freely therein on the wall surface of the opening 39. The wall surfaces 39 are of sufficient extent so that in the limited universal relative movement allowed the component parts 36 and 40 in actual operation the balls cannot roll off the spherical surface of the opening 39 but annular inturned flanges (not shown) may be formed as by peening operations at opposite ends of the spherical opening 39 to prevent accidental disassembly of the coupling parts prior to installation in the mechanism hereof.

In the embodiment of the engine control coupling, illustrated in Fig. 4, a broken line 45 indicates the maximum turned position of the body 36 in one direction with respect to the transverse axis of the bushing 40 to be about twenty degrees from the central or normal position shown in solid lines.

The bushings 40 of the couplings 35 are rotatably mounted on the clevis pins 34, respectively (Figs. 2 and 6), and the inner end portions of the push-pull rods 25 are adjustably threaded into the sockets 38 of the respective couplings. Because of the threaded connection between the couplings 35 and push-pull rods 25 not only is universal action provided between the crank arm 31 and the rods 25, but also by merely screwing the rods a selected distance into the socket 38, an adjustment is made in the effective length of the rods thereby to adapt the mechanism for installations of different dimensions and to permit selection of the position of the respective areas 10 to be wiped.

The outer end portion of each of the rods 25 is bifurcated as at 46 thereby to constitute a clevis which is provided with a transverse bore for receiving a clevis pin 48. Flattened upper end portions 49 of operating arms 50 in the form of threaded rods or bolts are disposed between the legs of the respective clevises 46 and are rotatably received upon the clevis pins 48, respectively, as by passing the pins through respective openings 51 (Fig. 5) in the arms 50.

Each of the operating arms 50 forms a part of its respective window unit 24. Each of said units additionally comprises a body member 52 (Fig. 5) preferably formed of brass or bronze and having a rectangular block portion 54 and an elongated tubular portion 55. The axial opening 56 of the tubular portion of each of the body members 52 extends through the block portion 54 and has a counterbore 58 at the end portion within the block portion. A self-oiling bearing or bushing 59 complementary to the opening 56 may be pressed or shrink fitted thereinto for rotatably supporting a complementary shaft 60 having an enlarged head portion 61 provided with a threaded transverse or diametral bore which extends through the head portion 61 and into which a threaded portion 62 of the associated operating arm 50 is received. Each of the shafts 60 is additionally provided with a splined (longitudinally serrated) portion 63 contiguous to a threaded outer end portion 64, both portions 63 and 64 extending outwardly beyond the outer end of the tubular portion 55.

Opposing elongated slots 65 in the block portion 54 in each of the window unit body members 52 open into the counterbore 58 to provide clearance for swinging movement of the associated arm 50. Paired, hardened liners in the form of apertured discs or washers 66 are disposed in the respective slots 65 to prevent the threaded portions 62 of the arms 50 from abrasive wearing against the side walls of the slots.

The window units 24 are suitably mounted above and in medial relation with respect to the respective area 10 (Fig. 1) to be wiped. Preferably, each of the units 24 is held in position against a channel member 67 (Figs. 2 and 3) as by a cap screw 68 and a stud 69. The stud 69 has axially spaced inner and outer threaded portions for receiving nuts 70 and 73, respectively. The channel 67 is suitably secured to the body panel C inside thereof and the screws 68, studs 69, and tubular portions 55 of bodies 52 pass through respective aligned openings in the channel and panel as well as in respective bearing plates 71, the nuts 70 being turned onto the threaded inner end portions of the screws and studs. respectively. The splined portions 63 and threaded portions 64 of the respective shafts 60 are thus disposed outside of the vehicle. The extreme outer end portions 69a of the studs 69 are provided with respective cotter key openings 69b (Fig. 2) and the adjacent outer threaded portions receive the respective nuts 73 which bear against the bearing plate 71.

When mounted as above described and as clearly shown in Fig. 2, it is apparent that the shafts 60 diverge outwardly of the vehicle and of the windshield panel A as do the corresponding axes 15 of Fig. 1 and thus are not parallel to the power output shaft 28 of the motive unit 26 which latter shaft corresponds with the axis 11 of Fig. 1.

Wiper blade drive arms 72 (Fig. 3) are received in adjusted turned positions on the splined portions 64 of the shafts 60, respectively, and are held thereon by respective nuts 74. The arms 72 have the usual pivoted and inwardly spring-biased lower end portions 75 mounting respective saddles 76 upon which wiper blades 78 having squeegee strips 79 are pivoted in a suitable manner. For holding the blades 78 in a vertical position and against rotary movement about their pivotal axes, respective tie rods 80 (Fig. 6) have their upper end portions 69a of the respective studs 69 and their lower end portions rotatably mounted on respective pins (not shown) rigidly secured to the saddles 76 but laterally displaced from the wiper blades as indicated by the lines 22 of Fig. 1. If desired, the tie rods 80 may be of adjustable length as by forming them of two threaded telescoping parts having a locking means such as a nut 81 (Fig. 6).

In operation, alternate rotary motion of the power output shaft 28 causes to and fro swinging movement of the crank arm 31 and consequent to and fro generally axially directed movement of the push rods 25. Since the shafts 60 and 28 are not parallel, to and fro movement of the rods 25 is accompanied by universal action of the couplings 35 and slight rotation of the arms 50 about the axes of the screw threads of said arms with respect to the shafts 60. Thus universal action of the window units 24 as well as of the couplings 35 combine to provide complete freedom of movement for the rigid rods 25. In other words, the couplings 35 and the window units 24, because of the universal action provided thereby, permit the direction of axial or linear movement of the push-pull rods 25 to vary during the operating cycle.

It is apparent that by adjusting the effective length of the rods 25, the areas 10 swept by the blades can be selected with respect to the transverse dimentions of the windshield, and that by varying the distance that the threaded arms 50 are screwed into the shafts 60, adjustment can be made of the width of the areas 10. As shown by broken lines in Fig. 6, one or both of the threaded arms 50 may be threaded into the openings in the shafts 60 from the bottom thereof thereby to reverse the relative direction of swinging motion between the arm 31 and the wiper blades 78. By arranging one arm 50 with its push-pull rod connection below the associated shaft 60 and the push-pull rod connection of the other arm above the associated shaft, as in Fig. 2, the wiper of one window unit will be swung in the same direction as will the wiper of the other unit, whereas with the connections made according to the diagram Fig. 1 the wipers swing oppositely of each other.

It is further apparent that for windshields of greater curvature than that shown (smaller radius) an additional universal connection (not shown) may be interposed between the shaft 60 and the wiper blade drive arm as, for example, disclosed in my application Serial No. 544,593, filed July 12, 1944.

I claim:

1. In a mechanism for transmitting alternate rotary motion between spaced non-parallel shafts, crank arms on said shafts respectively, a rigid link operatively connecting said crank arms, a universal coupling means interposed between one of said crank arms and one end of said link, said other crank arm being rotatable about its own axis, and means constituting a pivotal connection between said other end of said link and said other crank arm.

2. In a mechanism for transmitting alternate rotary motion between laterally spaced non-parallel shafts, a first crank arm rigidly secured to one of said shafts, a second crank arm mounted by the other of said shafts for rotation about its own axis, a rigid link operatively connecting said crank arms, a universal coupling means interposed between one end of said link and said first crank arm, and means constituting a pivotal connection between the other end of said link and said second crank arm.

3. In a mechanism for transmitting alternate rotary motion, laterally spaced non-parallel shafts, crank arms on said shafts respectively, a rigid link having its opposite end portions operatively connected to said crank arms respectively, one of the connections including a universal coupling between the connected parts and means permitting said other crank arm to rotate about its own axis upon lateral movement of said link during a working cycle.

4. In a mechanism for transmitting alternate rotary motion between laterally spaced non-parallel shafts, a first crank arm on one of said shafts, a threaded transverse opening in the other of said shafts, a second crank arm rotatably received in and in threaded engagement with said opening, a rigid link, a universal coupling means operatively connecting one end of said link and said first crank arm, and means constituting a pivotal connection between the other end of said link and said second crank arm.

5. In a mechanism for transmitting alternate rotary motion between laterally spaced non-parallel shafts, a first crank arm mounted by one of said shafts, a universal coupling means pivoted on the outer end of said first crank arm, a push-pull rod operatively secured to said universal coupling means, a second crank arm mounted for rotation about its own axis, and a pivotal connection between the outer end portion of said second crank arm and the end portion of said push-pull rod remote from said universal coupling means.

6. In a motion converting mechanism, a driving shaft, adapted to be driven by alternate rotary motion, a pair of mutually non-parallel driven shafts laterally spaced from said driving shaft, crank arms rotatably mounted by said driven shafts respectively and capable of rotation about their respective axes, a double-ended crank arm mounted by said driving shaft, and push rod means including respective universal joint means pivoted on opposing ends of said double-ended crank arms respectively and connected to respective driven shafts.

7. A motion transmitting and converting mechanism comprising a driving shaft, adapted to be driven by alternate rotary motion, a pair of mutually non-parallel driven shafts, crank arms mounted by said driven shafts, respectively, said crank arms each being rotatable about its own axis, a double-ended crank arm mounted by said driving shaft, rigid links interposed between opposing ends of said double-ended crank arm and said axially rotatable crank arms, respectively, and means constituting a universal coupling connecting one end of each link with one of the associated crank arms.

8. In a motion converting and transmitting mechanism for a windshield wiper, a shaft mounted for alternate rotary motion and adapted to support a wiper blade, a threaded transverse opening in said shaft, means constituting a crank arm received in said opening for rotation about the axis of said opening, a rigid link pivotally mounted at the outer end portion of said crank arm means, and means guiding said rigid link for push-pull motion which during an operating cycle varies in direction with respect to the axis of said shaft.

9. In a windshield wiping mechanism, a shaft mounted for alternate rotary motion and adapted to drive a wiper blade, a screw threaded transverse opening in said shaft, means forming a crank arm screw threaded into said opening and free to rotate about its own axis on the threaded connection, a rigid push-pull rod pivoted at the outer end portion of said crank arm means, and means guiding said push-pull rod for movement back and forth axially thereof while maintaining a portion of the rod remotely of the crank arm means in a plane out of parallelism with the plane of rotary movement of the crank arm means and the receiving opening therefor in the shaft.

10. A mechanism for transmitting alternate rotary motion from a drive shaft to two driven shafts in non-parallel relation to the drive shaft and to each other, said mechanism comprising lever means on the drive shaft, substantially rigid push-pull rods and universal joints respectively coupling the rods to the lever means for simultaneous axial reciprocation of the rods by the lever means, and universal driving connections, each including a crank arm in radially fixed but swiveled relation to a respective driven shaft between the driven shafts and respective rods.

COLUMBUS R. SACCHINI.

REFERENCES CITED

The following references are of record in the file of this patent:

UNITED STATES PATENTS

| Number | Name | Date |
|---|---|---|
| 634,205 | Diehl et al. | Oct. 3, 1899 |
| 1,275,288 | Moore | Aug. 13, 1918 |
| 1,510,509 | Stadeker | Oct. 7, 1924 |
| 1,641,683 | Malouf | Sept. 6, 1927 |
| 1,733,910 | Schmisch | Oct. 29, 1929 |
| 1,776,746 | Bantin | Sept. 23, 1930 |
| 1,776,747 | Bantin | Sept. 23, 1930 |
| 2,045,128 | Dystra | June 23, 1936 |
| 2,184,700 | Horton | Dec. 26, 1939 |
| 2,232,480 | Schmid | Feb. 18, 1941 |
| 2,252,350 | Paulus | Aug. 12, 1941 |